United States Patent [19]
Lee

[11] Patent Number: 5,867,702
[45] Date of Patent: *Feb. 2, 1999

[54] METHOD AND APPARATUS FOR INITIALIZING A MULTIPROCESSOR SYSTEM

[75] Inventor: Van Hoa Lee, Cedar Park, Tex.

[73] Assignee: International Business Machines Corporation, Armonk, N.Y.

[ * ] Notice: The term of this patent shall not extend beyond the expiration date of Pat. No. 5,642,506.

[21] Appl. No.: 787,652

[22] Filed: Jan. 23, 1997

Related U.S. Application Data

[63] Continuation of Ser. No. 587,259, Jan. 16, 1996, Pat. No. 5,642,506, which is a continuation of Ser. No. 355,866, Dec. 14, 1994, abandoned.

[51] Int. Cl.[6] .................................................. G06F 9/00
[52] U.S. Cl. ................................................ 395/651
[58] Field of Search .................................. 395/651, 652, 395/653

[56] References Cited

U.S. PATENT DOCUMENTS

| | | |
|---|---|---|
| 4,268,904 | 5/1981 | Suzuli et al. . |
| 4,377,000 | 3/1983 | Staab . |
| 4,698,753 | 10/1987 | Hubbins et al. . |
| 4,803,618 | 2/1989 | Ita et al. . |
| 5,136,713 | 8/1992 | Bealkowski et al. . |
| 5,155,833 | 10/1992 | Cullison et al. . |
| 5,210,875 | 5/1993 | Bealkowski et al. . |
| 5,274,797 | 12/1993 | Barlow et al. . |
| 5,327,548 | 7/1994 | Hardell, Jr. et al. ................ 395/474 |
| 5,349,664 | 9/1994 | Ikeda et al. . |
| 5,355,489 | 10/1994 | Bealkowski et al. . |
| 5,379,342 | 1/1995 | Arnold et al. . |
| 5,418,955 | 5/1995 | Ikeda et al. ........................... 395/651 |
| 5,450,576 | 9/1995 | Kennedy ................................. 395/652 |
| 5,491,788 | 2/1996 | Cepulis et al. . |

FOREIGN PATENT DOCUMENTS

| | | |
|---|---|---|
| 61-288262 | 12/1986 | Japan . |
| 63-5463 | 1/1988 | Japan . |
| 2-101566 | 4/1990 | Japan . |
| 3-269758 | 12/1991 | Japan . |
| 6-103250 | 4/1994 | Japan ............................. G06F 15/16 |

OTHER PUBLICATIONS

IBM TDB, Dual–Processor Boot Procedure For LAN Services, vol. 35, No. 3, Aug. 1992, pp. 306–316.

IBM TDB, Power on Machine Check for Multi–Processor System, vol. 25, No. 3B Aug. 1982, pp. 1776–1777.

IBM TDB, Generalized Interrupt Routing Mask for Global Queues, vol. 37, No. 09, Sep. 1994, pp. 351–354.

IBM TDB, Hardware/Software Interface for Turning On/Off Processors in an Multiprocessor Environment, vol. 37, No. 09, Sep. 1994, pp. 365–367.

"Programmable Timer for Watchdog Functions", Electronic Engineering, vol. 57 No. 700, Apr. 1985, pp. 41–42.

*Primary Examiner*—Thomas C. Lee
*Assistant Examiner*—St. John Courtenay III
*Attorney, Agent, or Firm*—Volel Emile

[57] ABSTRACT

An apparatus and method for booting a multiprocessor computer system including providing a first portion of boot code to multiple processors for execution, selecting a first processor, the selection based on which of the multiple processors first successfully executes the first portion of the boot code, providing a second portion of the boot code only to the first processor, and the first processor executing the second portion of the boot code to configure the multiprocessor system.

9 Claims, 4 Drawing Sheets

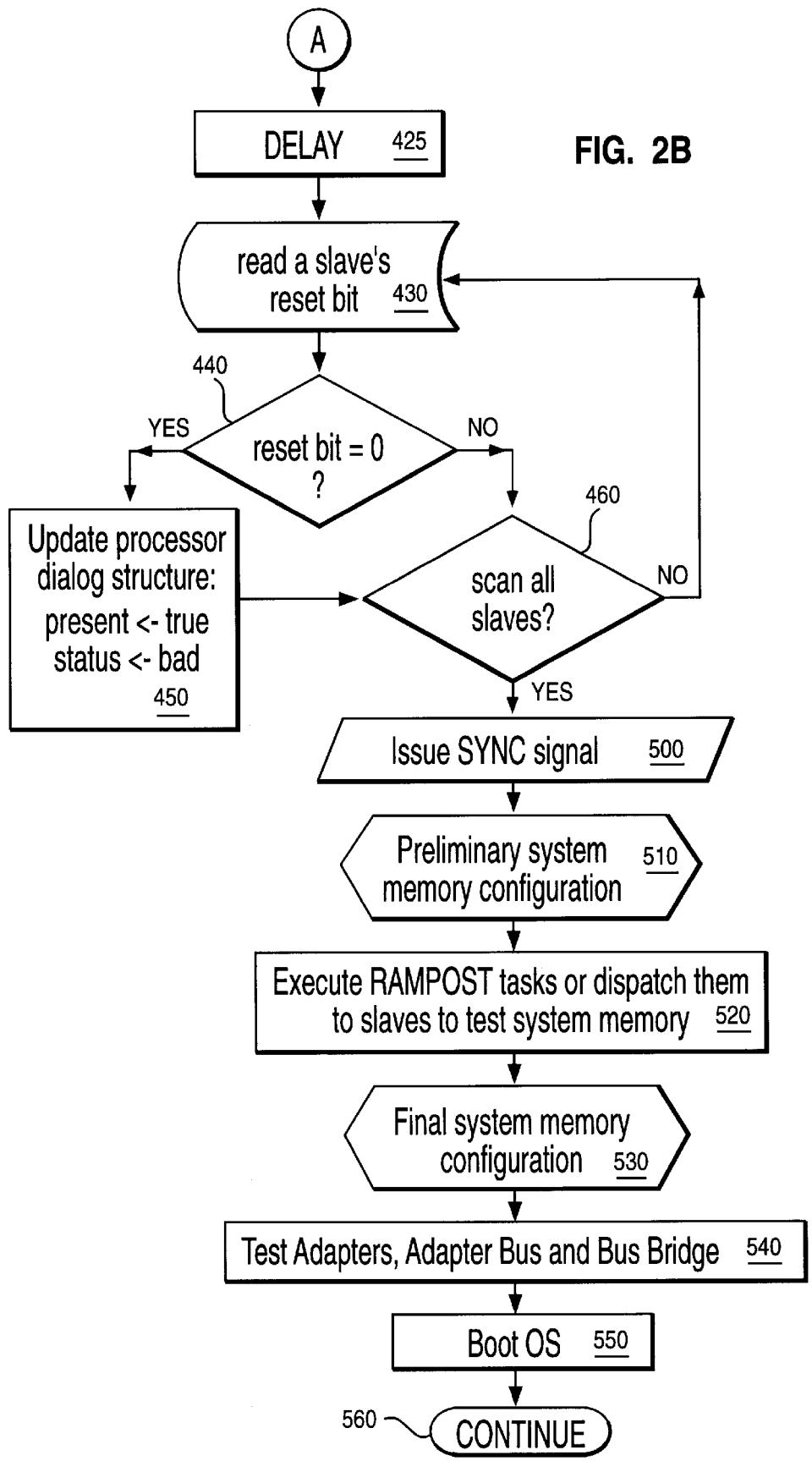

METHOD AND APPARATUS FOR INITIALIZING A MULTIPROCESSOR SYSTEM

This application is a continuation of application Ser. No. 08/587,259, filed on Jan. 16, 1996, now U.S. Pat. No. 5,642,506 which was a continuation of application Ser. No. 08/355,866, filed on Dec. 14, 1994, now abandoned.

TECHNICAL FIELD

The present invention relates generally to computer systems and more particularly to a method and apparatus for booting a multiprocessor computer system.

BACKGROUND ART

Systems composed of multiple but coordinated processors were first developed and used in the context of mainframes. More recently, interest in multiple processor systems has increased as a consequence of the low cost and high performance of microprocessors, with the objective of replicating mainframe performance through the parallel use of multiple microprocessors.

A variety of architectures have been defined for multiprocessor systems. Most designs rely upon highly integrated architectures by virtue of the need for cache coherence. In such systems, cache coherence is maintained through complex logic circuit interconnection to cache memories associated with the individual microprocessors to ensure data consistency as reflected in the various caches in main memory.

One problem that exists with these highly integrated architectures is the initializing or booting of the multiprocessor system as the system is turned on. Various techniques have been utilized to handle this initial coordination of the multiprocessors during boot. Some systems dedicate a surface or auxiliary processor for this management process during boot. That is, a specialized processor or hardware is utilized for testing system memory and coordinating the booting of each of the processors. However, this dedicated service processor or hardware is either not utilized or is underutilized after system boot. In addition, should the dedicated service processor or hardware fail for some reason, then the whole system cannot boot as a result.

Another approach has been to use multiple copies of the boot code, one for each processor. Each processor boots itself and one of the processors has additional boot code for booting the system configuration. However, this requires large amount of ROM for storing multiple copies of the boot code. In addition, should the processor responsible for booting the system fail for some reason, then the system cannot boot as a result. One example of this approach is disclosed in "Apparatus and Method for Booting a Multiple Processor System Having a Global/Local Memory Architecture", U.S. Pat. No. 5,448,716, filed Oct. 30, 1992, hereby incorporated by reference. One main disadvantage to this approach is that separately stored copies of the boot code are provided to each processor, whether or not that processor utilizes that boot code.

DISCLOSURE OF THE INVENTION

The present invention includes an apparatus and method for booting a multiprocessor computer system including providing a first portion of boot code to multiple processors for execution, selecting a first processor, the selection based on which of the multiple processors first successfully executes the first portion of the boot code, providing a second portion of the boot code only to the first processor, and the first processor executing the second portion of the boot code to configure the multiprocessor system.

A further understanding of the nature and advantages of the present invention may be realized by reference to the remaining portions of the specification and the drawings.

BRIEF DESCRIPTION OF THE DRAWING

FIGS. 2A–2C are a flowchart describing the boot process according to a preferred embodiment of the invention.

BEST MODE FOR CARRYING OUT THE INVENTION

This disclosure describes an improved method and apparatus for booting a multiprocessor system such as a symmetric multiprocessor system. Booting is the process of testing and configuring a computer system when the system is turned on or receives a restart signal (such as the concurrent control alternate delete (CTL_ALT_DEL) key press by a user. In the preferred embodiment, a single copy of the boot code is stored in a global read-only memory (ROM) for utilization by each of the multiple processors. The processors then contend for becoming the master processor that coordinates the booting of the system. Once one processor becomes the master processor, the other processors become slave processors. The master processor then performs and coordinates the booting of the system and may distribute the boot workload among the slave processors as desired.

As a result of this technique, only a single copy of the boot code is needed for booting the system. In addition, multiprocessors systems utilizing the present invention will boot even if one or more of the multiple processors are in error and unable to boot up, thereby providing a high availability system.

Figure 1:
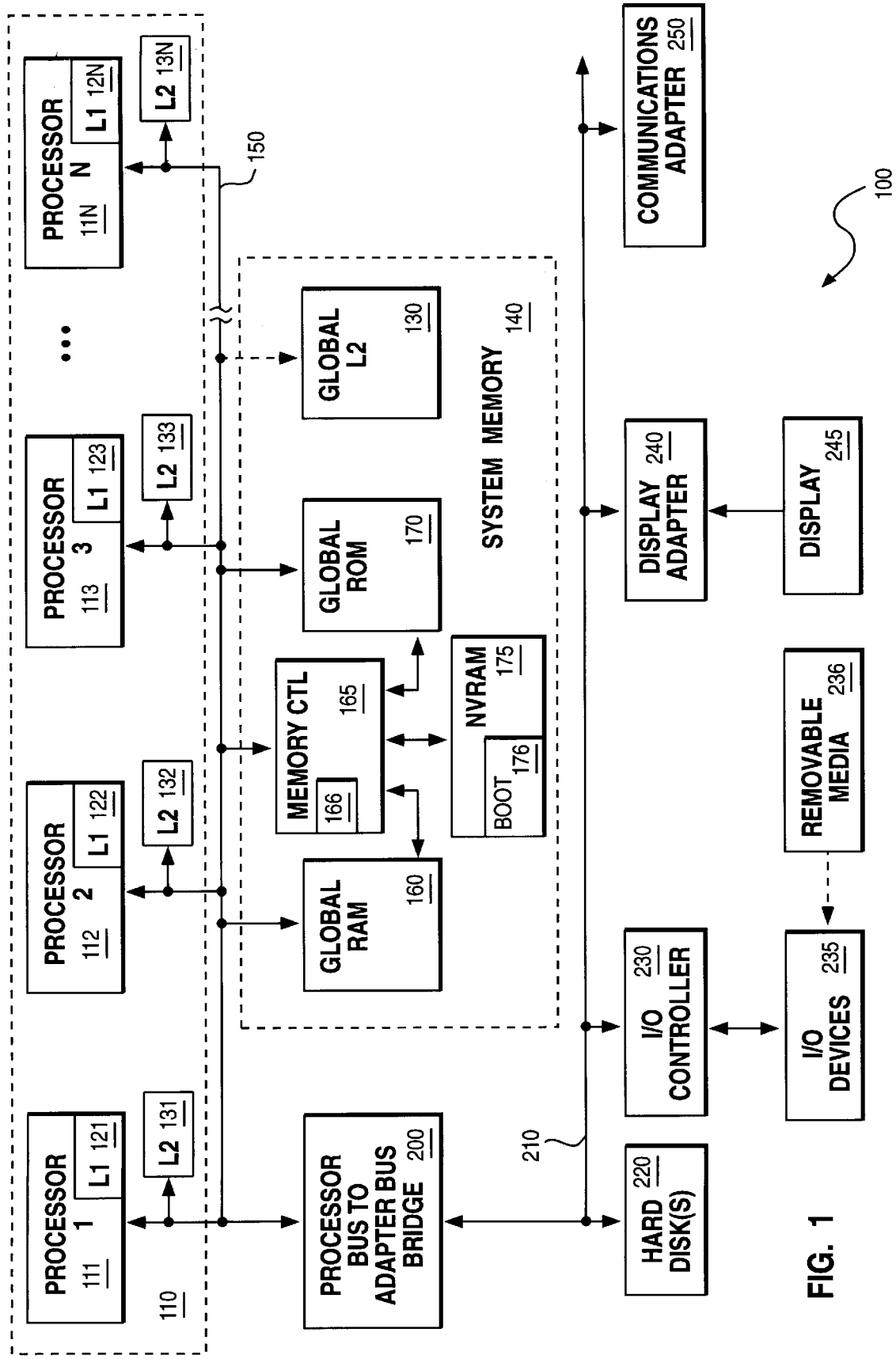
FIG. 1 is a diagram of a digital computer utilized by a preferred embodiment of the invention.

FIG. 1 is a block diagram of a digital multiprocessor computer 100 utilized by a preferred embodiment of the invention. The computer includes main multiprocessor complex 110, including processors 111, 112, and 113 through 11N. Clearly, more or fewer processors may be utilized while embodying the present invention. In the preferred embodiment, each of the processors is a PowerPC 604 (trademark of International Business Machines, Corp.) microprocessor, although one of ordinary skill in the art would be able to apply the techniques of the present invention to other processors as well. Each of the processors includes its own L1 cache 121 through 12N which is typically found on the same microprocessor chip as the processor. In addition, each of the processors typically has its own L2 cache 131 through 13N. However, in alternative embodiments, a global L2 cache 130 may be utilized in lieu of the dedicated L2 caches for each processor.

The processors communicate with each other and with system memory 140 across a high speed system bus 150. System memory 140 includes a possible global L2 cache 130, a global random access memory (RAM) 160, a global read only memory (ROM) 170, a memory controller 165, and. a non-volatile RAM (NVRAM) 175. The global RAM is volatile memory used by each of the processors to store data and instructions for later access as desired. The global ROM is non-volatile memory that includes data and instructions stored in the system, typically by the manufacturer of the computer system. NVRAM 175 is non-volatile RAM that can be modified by the processors and includes boot code 176 for booting the system as it is turned on or restarted. Boot code 176 includes several portions, including a portion for a processor to test itself, a portion for the processor to contend with the other processor to become a master processor, and a portion for testing and configuring the multiprocessor systems as a whole. The memory controller controls some of the operations of global RAM 160, global ROM 170 and NVRAM 175 and includes several internal registers including master flag 166.

Also attached to the system bus 150 is processor bus to adapter bus bridge 200. This bus bridge allows multiple devices to communicate with each of the processors and/or system memory across adapter bus 210 through bus bridge 200 without unduly loading system bus 150. In the preferred embodiment, the adapter bus 210 is a PCI bus, although one of ordinary skill in the art would be able to apply the techniques of the present invention to other adapter buses as well. Coupled to the bus bridge across an adapter bus 210 is a hard disk 220 for storing large amounts of data and instructions, such as an operating systems and multiple software applications, in a non-volatile environment. I/O controller 230 is also coupled to bus bridge 200 across adapter bus 210 and is used for handling communications with attached or external I/O devices such as a keyboard, mouse, floppy disk drive, etc. Removable media such as a floppy disk may be inserted into a floppy disk drive for use by the computer 100. System memory 140, hard disk 220 and removable media 236 are all referred to as memory for storing data and instructions for processing by multiprocessor complex 110. A display adapter 240 may also be coupled to bus bridge 200 across adapter bus 210 for displaying data on a display adapter 245. In addition a communications adapter 250 may be attached to adapter bus 210 for communicating data across a remote LAN or a modem to remote processing units or memory.

Figure 2A:
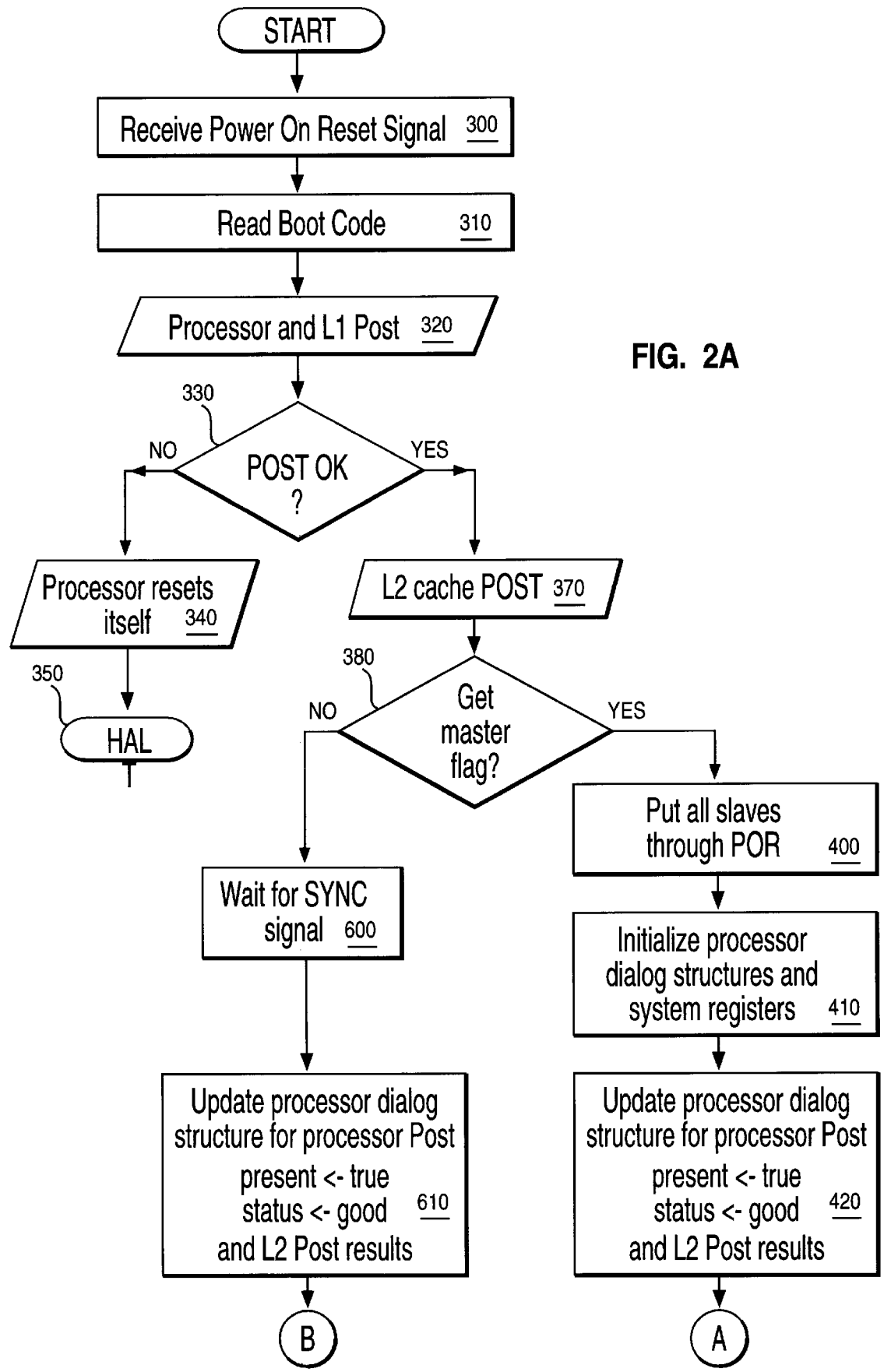
Figure 2C:
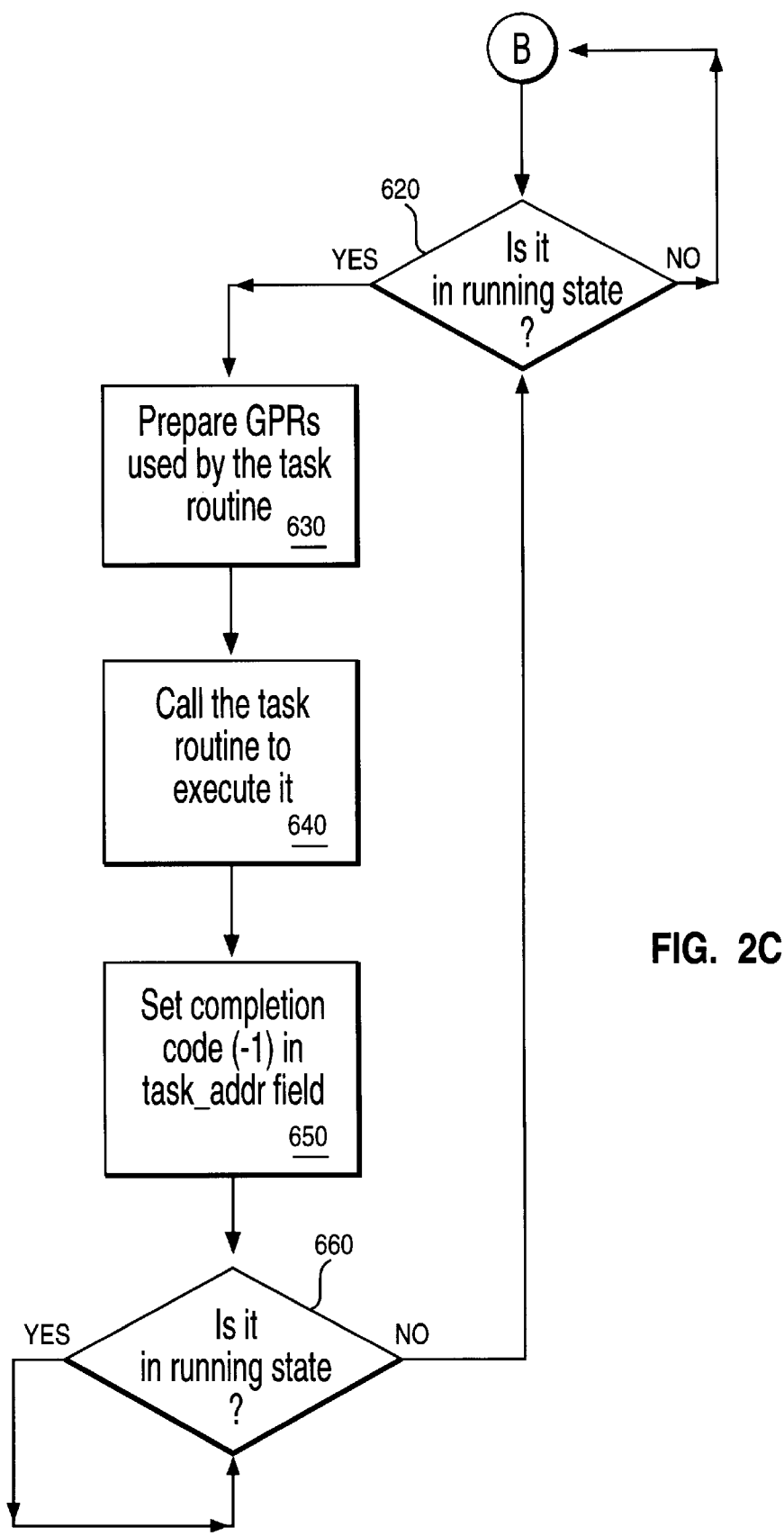

FIGS. 2A–2C are a flowchart illustrating a preferred method for booting a multiprocessor system. This flowchart illustrates the flow of the boot code stored in NVRAM and is independently executed by each of the processors. In a first step 300, the processor receives a power on reset (POR) or start signal across the system bus which is a signal that is hardwired into the system whenever the system is turned on or receives a command to reset. This type of signal is well known in the art. Although a common signal may be sent to all the processors, each processor may receive the signal at a slightly different time. In step 310, the processor then reads a first section of centrally stored boot code 176 for receiving instructions to initiate booting. In an alternative embodiment, this first portion of the boot code may be separately stored in dedicated storage areas for each processor and individually provided upon request to each processor. The processor will then read additional sections of boot code 176 as needed throughout the boot process. In step 320, the processor then performs a power on self test (POST) of its L1 cache and other processor registers. This POST is typically by writing and reading data from the L1 cache and processor registers without loading any data on the processor bus. In step 330, the processor determines whether or not the POST was successful. If not, then in step 340, the processor resets itself to prevent it from responding to input across the processor bus, thereby halting its operation in step 350 unless the processor receives another power on reset (POR) signal across the system bus. This prevents many types of malfunctioning processors from corrupting desired activities of the system. If yes in step 330, then the processor proceeds to step 370 where the processor performs a POST of its local L2 cache and retains the results for later storage in the dialog structure described below.

In step 380, the processor then attempts to obtain the master flag 166 from memory controller 165. If the processor is the first processor attempting to get the master flag, then the processor will be successful, the flag will be turned on by the memory controller to prevent other processors from obtaining the flag, and the processor will proceed on to step 400. If the processor is not successful and another processor has already obtained the master flag, then the processor will continue processing in step 600.

If the processor has obtained the master flag, then the processor is a master processor and will initiate the overall system test and configuration. Preferably, the master processor obtains the necessary boot code for this portion of the boot process from NVRAM at this time. In step 400 the master processor will power-on reset (POR) all the other processors. This will help synchronize all the other processors. In addition, any processors previously halted will retest themselves because some of the processors may have been halted due to power-up transient signals that caused temporary errors that clear once the system has been powered up for a while. Processing then continues to step 410 where the master processor will initialize any master processor system registers and a set of dialog structures in NVRAM. Table 1 is a C code listing of a preferred set of dialog structures with initial values. The initial values are set assuming that the whole system is operating properly and will be modified if the master processor determines otherwise during the rest of the boot process. For example, it is assumed that each of the processors and their local L2 caches are operating properly. The dialog structure is a set of data structures and information that an operating system uses to determine how to utilize the multiprocessor system. For example, if one of the processors or one of the L2 caches is not functioning, the operating system may distribute its workload differently across the system.

TABLE 1

Dialog Structure with Initial Values

```
#define MP_WAY_SUPPORT 4
#define TRUE 1
#define FALSE 0
#define GOOD 0
#define BAD 1
#define MASTER 1
#define SLAVE 0
#define BROKEN 0
#define IDLING 1
#define RUNNING 2
extern unsigned long get_L2_result(void);
extern unsigned long read_processor_PID(void);
_DIALOG p_dialog[MP_WAY_SUPPORT];
unsigned long i,j,k;
for(i=0;i<MP_WAY_SUPPORT;i++)
{
    p_dialog[i].struct_size=sizeof(_DIALOG);
    p_dialog[i].num_of_structs=MP_WAY_SUPPORT;
    p_dialog[i].index=j=read_processor_PID( );
    p_dialog[i].p_present=(i==j)?TRUE:FALSE;
    p_dialog[i].p_status=GOOD;
    p_dialog[i].p_master=(i==j)?MASTER:SLAVE;
    p_dialog[i].p_state=(i==j)?RUNNING:IDLING;
    k=get_L2_result( );
    p_dialog[i].L2_present=(i!=j)?FALSE:PRESENT_BIT(K);
    p_dialog[i].L2_status=(i!=j)?BAD:STATUS_BIT(k);
    p_dialog[i].L2_size=(i!=j)?0:SIZE_FIELD(k);
    p_dialog[i].task_addr=(void*)NULL;
}
```

Processing then continues to step 420 where the master processor updates the dialog structure based on its own processor POST performed in steps 320 and 370 above. For example, if the master processor L2 cache is not performing properly, then the dialog structure will be modified to reflect that problem. In step 425, the master processor then delays performing the rest of the boot process to allow all of the slave processors to reach step 600 described below. Following the delay, the master processor will query each of the slave processors reset bit which is stored in the memory controller and may be set by the individual slave processors in step 340 above. The master processor performs this task by reading a first slave processors reset bit in step 430. In step 440, the master processor determines whether the reset bit is equal to 0. If yes, then in step 450 the master processor updates the dialog structure indicating that the slave processor being queried is not functioning and should not be utilized. If no in step 440 or if step 450 has been performed, the master processor determines in step 460 whether all the slave processors have been queried. If no, then processing returns to step 430 for querying the next slave processor. If yes in step 460, then processing continues to step 500.

In step 500, the master processor will then issue a sync signal to synchronize all the slave processors and initiate their processes so that the slave processors will be able to handle some of the boot tasks as directed by the master processor as described below. In step 510, the master processor will then begin a preliminary system memory configuration. That is, the master processor will assume that the memory system is functioning properly and initiate its functioning such as turning on refresh of the global RAM by the memory controller. In step 520, the master processor will then execute system memory POST tasks or dispatch these tasks to slave processors to test system memory. For example, one slave processor may test whether all the RAM is functioning properly or whether portions of RAM should not be used while the master processor tests various registers in the memory controller. In step 530, the master processor will then perform final system memory configuration based on the system memory POST results. In step 540, the master processor will then test the bus bridge, the adapter bus, and the various adapters on the adapter bus or the master processor may dispatch some or all of these tasks to the various slave processors. Based on these results, the master processor may disable the adapter and/or store this information in NVRAM or RAM for later use by the operating system. The master processor will then boot the system operating system in step 550, thereby completing the boot process. Processing by the processors will now operate in step 560 under the control of the operating system based on the dialog structure described above.

As described above, if a processor does not obtain the master flag in step 380, then the processor is a slave processor and will proceed to step 600. As described above, the slave processor may be reset by the master processor in step 400 and will then reexecute steps 300–380 and 600. In step 600, the slave processor will then wait for a SYNC signal from the master processor. Once received, the slave processor will then in step 610 update the processor dialog structure for processor post and L2 post results. In step 620, the slave processor will then determine whether it is in an idle state, a running state, or a non-execute state by querying the dialog structure set by the master processor. If the slave processor is in an idle state, then the slave processor is available to receive tasks from the master processor. If the slave processor is in a non-execute state, the slave processor is not available for performing any tasks. This state may be caused by the slave processor previously being halted due to slave processor errors or by other master processor tests of the slave processor. If the slave processor is in a running state, then the slave processor has just received a task from the master processor. Once the slave processor enters the running state, then in step 630 the slave processor prepares general purpose registers (GPRs) to initiate performing a task. In step 640, the slave processor then calls the task from the boot code to perform the task for the master processor. In step 650, the slave processor then sets a completion code in the dialog structure indicating that the task is completed. At this point, the slave processor is still in the running mode although the task is completed until the master processor acknowledges the completion of the task. The slave processor then loops in step 670 until such acknowledgement occurs, thereby resetting the running state bit to idle, and returns to step 620 to await the next task.

When the operating system takes control of the computer system, the operating system may use various techniques, such as having the master processor request the slave processors perform specified tasks or through an interrupt such as an external interrupt, to establish control over the slave processors.

There are many advantages to the present invention. For example, any one or several of the multiprocessors may fail, yet the system will still boot if only a single processor functions properly. In addition, only a single copy of the boot code is stored in a central location, thereby minimizing the use of expensive storage and also allowing for easier manufacturing, maintenance, or upgrading of a multiprocessor system. Furthermore, the boot workload may be flexibly shared by the master processor among and the various slave processors, thereby speeding up the boot process. In addition, the present invention is flexible to handle many types of multiprocessor systems.

Although the present invention has been fully described above with reference to specific embodiments, other alternative embodiments will be apparent to those of ordinary skill in the art. For example, other methods of providing system operations data to an operating system may be utilized such as in a file in global RAM. Therefore, the above description should not be taken as limiting the scope of the present invention which is defined by the appended claims.

What is claimed is:

1. A method of initializing a plurality of processors of a multiprocessor computer system comprising the steps of:

executing a first portion of initialization code by each of the plurality of processors;

executing a second portion of initialization code by a first processor to complete execution of said first portion of initialization code and obtain a master flag from a shared memory connected to all of said plurality of processors while denying access to said second portion to all remaining processors; and said first processor configuring the multiprocessor system.

2. The method of claim 1 wherein the step of configuring the multiprocessor system includes said first processor distributing subportions of said second portion of said initialization code to other processors for execution.

3. The method of claim 2 including the step of executing said first portion of initialization code from the shared memory.

4. A multiprocessor computer system comprising:

means for executing a first portion of initialization code by a plurality of processors;

means for executing a second portion of initialization code by a first processor to complete execution of said first portion of initialization code and obtain a master flag from a shared memory connected to all of said plurality of processors and means for denying access to said second portion to all remaining processors; and means for configuring said multiprocessor computer system by said first processor.

5. The multiprocessor computer system of claim 4 wherein said configuring means includes means for distributing subportions of said second portion of said initialization code by said first processor to other processors for execution.

6. The multiprocessor computer system of claim 5 including means for executing said first portion of initialization code from the shared memory.

7. A computer system comprising:

a plurality of processors for processing data;

a memory for storing an initialization code;

means for acquiring and executing a first portion of said initialization code by each of the plurality of processors;

means for acquiring and executing a second portion of said initialization code by a first processor to complete execution of said first portion of initialization code and obtain a master flag from a shared memory connected to all of said plurality of processors and means for denying access to said second portion to all remaining processors; and means for configuring the multiprocessor system by said first processor.

8. The multiprocessor computer system of claim 7 wherein said configuring means includes means for distributing subportions of said second portion of said initialization code by said first processor to other processors for execution.

9. The multiprocessor computer system of claim 8 including means for executing said first portion of initialization code from the shared memory.

* * * * *